US008457160B2

(12) United States Patent
Otani

(10) Patent No.: US 8,457,160 B2

(45) Date of Patent: Jun. 4, 2013

(54) SYSTEM AND METHOD FOR PACKETIZING IMAGE DATA FOR SERIAL TRANSMISSION

(75) Inventor: Takuya Otani, Tokyo (JP)

(73) Assignee: Agilent Technologies, Inc., Santa Clara, CA (US)

( * ) Notice: Subject to any disclaimer, the term of this patent is extended or adjusted under 35 U.S.C. 154(b) by 784 days.

(21) Appl. No.: 12/472,406

(22) Filed: May 27, 2009

(65) Prior Publication Data

US 2010/0303097 A1 Dec. 2, 2010

(51) Int. Cl.
*H04J 3/06* (2006.01)

(52) U.S. Cl.
USPC ............................ 370/474; 370/503; 348/180

(58) Field of Classification Search
USPC .......................................... 370/474, 503, 509
See application file for complete search history.

(56) References Cited

U.S. PATENT DOCUMENTS

| | | | | |
|---|---|---|---|---|
| 5,387,941 | A * | 2/1995 | Montgomery et al. | 348/473 |
| 5,473,385 | A * | 12/1995 | Leske | 375/240.26 |
| 6,088,045 | A * | 7/2000 | Lumelsky et al. | 345/531 |
| 6,396,542 | B1 * | 5/2002 | Patel | 348/445 |
| 7,446,774 | B1 * | 11/2008 | MacInnis et al. | 345/519 |
| 7,599,439 | B2 * | 10/2009 | Lavelle et al. | 375/240.26 |
| 2006/0043312 | A1 * | 3/2006 | Siebert et al. | 250/398 |
| 2006/0082476 | A1 * | 4/2006 | Boyd et al. | 341/100 |
| 2006/0242669 | A1 * | 10/2006 | Wogsberg | 725/74 |
| 2007/0009060 | A1 * | 1/2007 | Lavelle et al. | 375/295 |
| 2008/0136974 | A1 * | 6/2008 | Yuan et al. | 348/744 |
| 2008/0204483 | A1 * | 8/2008 | Abe et al. | 345/690 |
| 2008/0273113 | A1 * | 11/2008 | Hayon et al. | 348/446 |
| 2009/0002359 | A1 * | 1/2009 | Tamura | 345/213 |
| 2009/0135304 | A1 * | 5/2009 | Inoue et al. | 348/712 |
| 2009/0172218 | A1 * | 7/2009 | Rainho Almeida et al. | 710/65 |
| 2010/0238951 | A1 * | 9/2010 | Ozawa | 370/465 |
| 2011/0199383 | A1 * | 8/2011 | Anderson et al. | 345/581 |

* cited by examiner

*Primary Examiner* — Hassan Kizou
*Assistant Examiner* — Robert A. Shand

(57) ABSTRACT

A system for packetizing parallel image data for serial transmission includes a software element configured to receive a bitmap image file comprising R, G and B pixel data, receive information relating to display and timing information associated with a device under test, receive a vertical synchronization signal, and receive at least one horizontal synchronization signal, packetize the vertical synchronization signal, wait a period of time before packetizing the horizontal synchronization signal, and packetize the R, G, and B pixel data associated with the bitmap image file to form a parallel packet stream. The system also includes a hardware element comprising a parallel data sequencer comprising a memory, the memory configured to store the parallel packet stream, a parallel-to-serial converter configured to convert the parallel packet stream into a serial packet stream, and a serial line driver configured to transfer the serial packet stream to a device under test.

14 Claims, 7 Drawing Sheets

SYSTEM AND METHOD FOR PACKETIZING IMAGE DATA FOR SERIAL TRANSMISSION

BACKGROUND

A typical display system generally uses a processor to transmit image information in parallel to a display device. In one common display system, red (R), green (G) and blue (B), also referred to as RGB, information relating to each pixel is sent to the display in parallel, along with a clock signal and both horizontal (Hsync) and vertical (Vsync) synchronization signals.

However, difficulties arise when attempting to test such a display system when no processor is available. Typically, a pattern generator is supplied with the user RGB data, along with the horizontal and vertical synchronization signals and the clock signal, and then generates the parallel image data. However, it is becoming increasingly desirable to reduce power consumption and the number of pins associated with this type of data transmission. This desire has given rise to the use of a packet-based serial data transmission methodology for delivering display data to a display system. Unfortunately, converting the parallel image data to a serial data stream requires precise timing and clocking signals. When the parallel data is being converted to serial data for transmission in a packet-based system, the system "overhead" must be considered. For example, when the data is formatted for a packet-based system, header, and error correction/detection mechanisms are added to the image data. The transmission time for this overhead data needs to be considered when transmitting the image data to the display.

Therefore, it is desirable to have a simple and accurate way to convert parallel image data to a serial bit stream, while retaining proper signal timing and display information.

SUMMARY

An embodiment of a system for packetizing parallel image data for serial transmission comprises a software element configured to receive a bitmap image file comprising R, G and B pixel data, receive information relating to display and timing information associated with a device under test, receive a vertical synchronization signal, and receive at least one horizontal synchronization signal, packetize the vertical synchronization signal, wait a period of time before packetizing the horizontal synchronization signal, and packetize the R, G, and B pixel data associated with the bitmap image file to form a parallel packet stream. The system also includes a hardware element comprising a parallel data sequencer comprising a memory, the memory configured to store the parallel packet stream, a parallel-to-serial converter configured to convert the parallel packet stream into a serial packet stream, and a serial line driver configured to transfer the serial packet stream to a device under test.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

DETAILED DESCRIPTION

Figure 1:
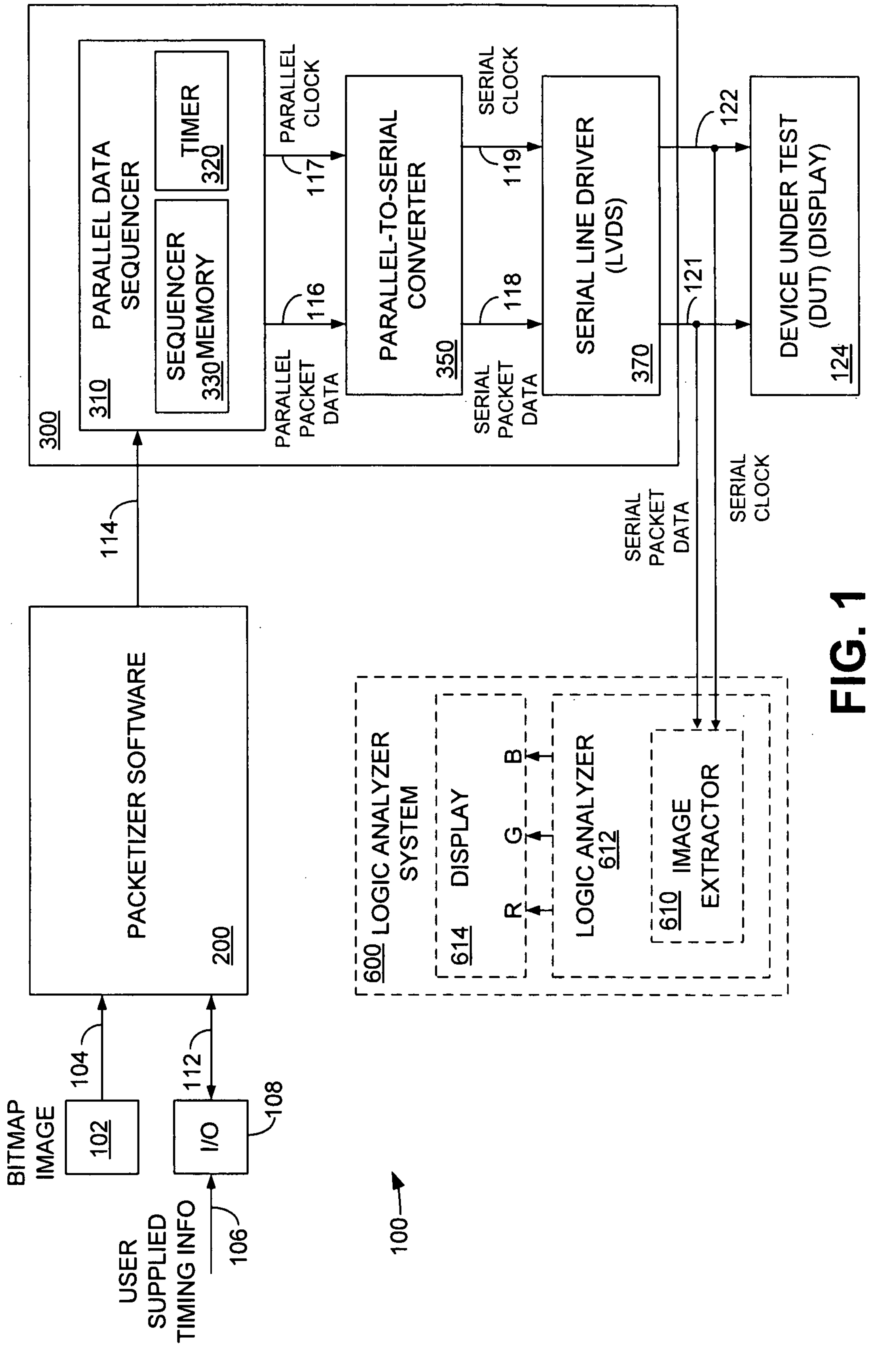
FIG. 1 is a block diagram schematically illustrating an embodiment of a system for packetizing image data for serial transmission.

The system and method for packetizing parallel image data for serial transmission can be implemented on any display system that employs a serial transmission methodology for displaying the image data. The system and method for packetizing parallel image data for serial transmission can be implemented in hardware, software, or a combination of hardware and software. When implemented using a combination of software and hardware, the system and method for packetizing parallel image data for serial transmission can be implemented using software or firmware programming and specialized hardware elements and logic. When the system and method for packetizing parallel image data for serial transmission is implemented fully or partially in software, the software portion can be used to perform at least a portion of the data format conversion to precisely control the various components of the system and method for packetizing parallel image data for serial transmission. The software can be stored in a memory and executed by a suitable instruction execution system (microprocessor). The hardware implementation of the system and method for packetizing parallel image data for serial transmission can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for packetizing parallel image data for serial transmission comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

As will be described below, in an embodiment, the system and method for packetizing parallel image data for serial transmission can convert bitmap image data into a packet-based serial data transmission methodology for display of the image.

FIG. 1 is a block diagram schematically illustrating an embodiment of a system for packetizing image data for serial transmission. In an embodiment, the system 100 can be implemented in, or as part of a test and measurement device, such as a pattern generator or network analyzer. In alternative embodiments, the system 100 can be implemented on a general or special purpose computing device to test a display device when no processor is available.

The system 100 includes packetizer software 200 and hardware element 300. The packetizer software 200 receives image data, in the form of a bitmap image 102 over connection 104. In an embodiment, the bitmap image 102 can be supplied by a user of the system, can be automatically supplied as part of an image display process, or can otherwise be transmitted to the system 100. The packetizer software 200 is also coupled to an input output element 108. Using the input output element 108, user supplied timing information and display parameters are supplied by a user to the packetizer software 200 via connection 106. These parameters are then provided over connection 112 to the packetizer software 200. As an example, the user supplied timing information and display parameters can include the frame rate (i.e., the frequency with which the display updates the screen image), the number of blank lines before the pixel data begins (i.e., the time from when a vertical synchronization signal is received to the time when a first horizontal synchronization signal is received), the number of blank pixels from where the pixel data ends to the end of a horizontal line, the number of blank lines after the end of the pixel data, etc.

From the supplied bitmap image 102, the packetizer software 200 then generates packetized data including timing information in a parallel bit stream. The packetized data is provided over connection 114 to the hardware element 300.

The hardware element 300 includes a parallel data sequencer 310, a parallel-to-serial converter 350 and a serial line driver 370. The parallel data sequencer 300 includes a timer 320 and a sequencer memory 330. The output of the parallel data sequencer 310 comprises parallel packet data on connection 116 and a parallel clock signal on connection 117. The parallel packet data on connection 116, in this embodiment, comprises eight bits, or one byte of data, and includes all packet-based timing and overhead information, as will be described below.

The parallel to serial converter 350 serializes the parallel data and provides a serial packet data stream on connection 118 and a serial clock signal on connection 119.

The serial line driver 370 adjusts the voltage and current levels of the signals on connections 118 and 119 appropriate for the device under test, and provides the serial packet data over connection 121 and the serial clock signal 122 to a device under test 124. The device under test can be a display system, or the like, and generally includes a serial-to-parallel converter to recover the R, G and B pixel data along with the parallel clock signal.

In an embodiment where the device under test 124 is driven by a separate processor (not shown) and it is desirable to observe the serial bit stream provided to the device under test 124, an optional logic analyzer system 600 can be coupled to the serial packet data communication line 121 and to the serial clock line 122. In such an embodiment, the logic analyzer system 600 can be used to monitor, also referred to as "snoop" the serial communication line to visually monitor the image data that is on the serial communication line 121. The logic analyzer system 600 includes a logic analyzer 612 and a display 614. The logic analyzer 612 includes an image extractor 610. The image extractor 610 receives the serial packet data stream on connection 121 and the serial clock on connection 122 and converts the serial data stream to a parallel data, unpacketizes the data to extract and display the image data that is being carried on the communication line 121 in RGB format as a bitmap image for display on the display 614.

Figure 2:
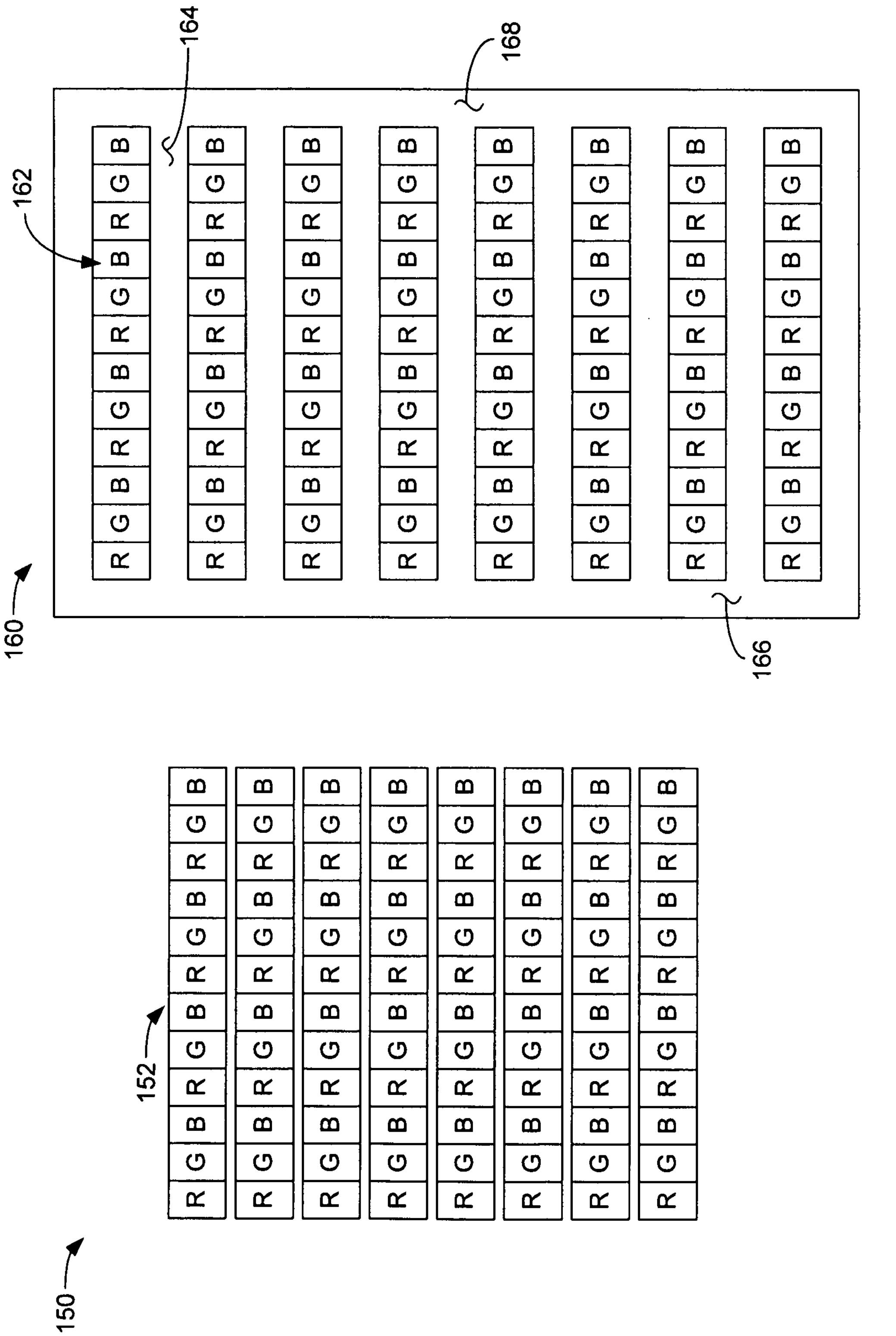
FIG. 2 is a schematic diagram showing a user supplied bitmap file, which corresponds to the bitmap image shown in FIG. 1.

FIG. 2 is a schematic diagram 150 showing a user supplied bitmap file 152, which corresponds to the bitmap image 102 of FIG. 1. The bitmap file 152 comprises a raw image data file in that it includes no presentation or timing information, such as, for example whether blank lines should be inserted at the beginning or the end of each line, whether blank spaces should be inserted to the left or the right of the display, etc. As will be described in greater detail below, the packetizer software 200 receives the original bitmap file 152, receives user supplied timing information that defines the blank lines, and the number of blank pixels on top, bottom, left and right of the screen, and forms the raw bitmap data into packets. This can be illustrated using the schematic diagram 160, showing the insertion of blank lines 164, spaces 166 and 168, to convert the original bitmap image 150 into a bitmap image 160 that includes display and timing information. While schematically depicted in FIG. 2, the operation of the packetizer software 200 will be described in greater detail below.

Figure 3:
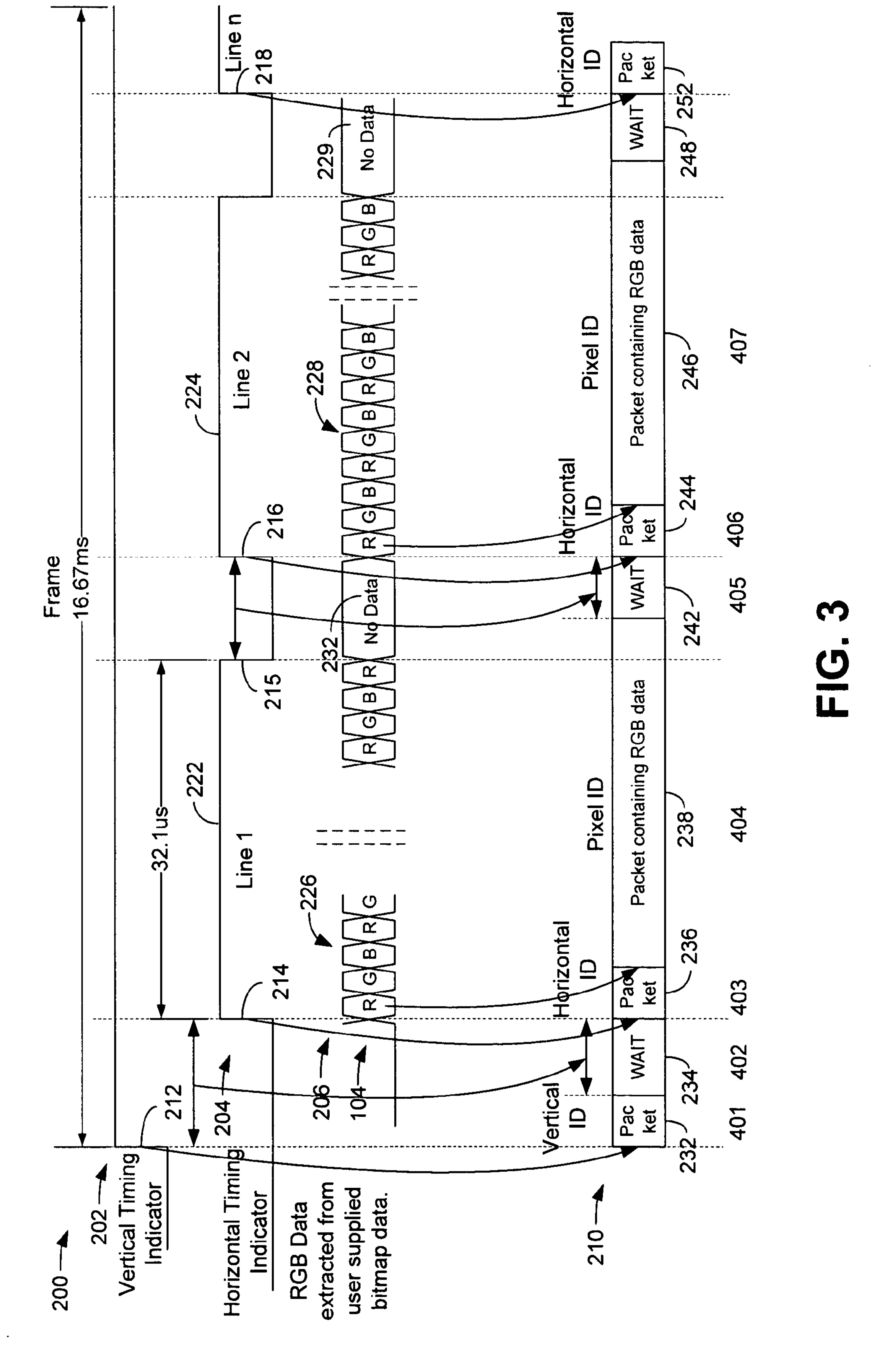
FIG. 3 is a timing diagram illustrating the operation of an embodiment of the packetizer software of FIG. 1.

FIG. 3 is a timing diagram illustrating the operation of an embodiment of the packetizer software 200 of FIG. 1. The timing diagram 200 includes a trace 202 that represents a vertical timing indicator (Vsync) signal, a trace 204 that represents a horizontal timing indicator (Hsync) signal, a trace 206 that represents image data extracted from the user supplied bitmap image 102 over connection 104, and a data stream 210 that represents packetized RGB data. The packetizer software 200 generates RGB data including vertical and horizontal timing information included in the data stream 210. Based on the user supplied timing information, the packetizer software 200 can determine the appropriate spacing between the vertical timing indicator signals and/or the spacing between the horizontal timing indicator signals. In addition, based on the user supplied timing information, the packetizer software 200 can also determine the amount of delay between the horizontal timing indicator signal and the vertical timing indicator signal. Once the packetizer software 200 determines the desired waveform timing, it processes the timing information and the pixel data into the data stream 210.

The rising edge 212 represents the vertical timing indicator, which is active, also referred to as "logic high," during each frame of data. The duration of each frame depends on the number of frames per second provided by the display. For example, if the display provides 60 frames per second to display an image, then the vertical timing indicator is active, logic high, for 1000 ms (milliseconds)/60 frames per second, or approximately 16.67 ms for each frame.

The rising edges 214, 216 and 218 represent the beginning of each horizontal timing indicator. The duration of each horizontal timing indicator is determined by the duration of a vertical timing frame (~16.67 ms), the number of lines in the display, and the number of blank lines on the top and bottom of the display, supplied as display parameter information by a user. Using VGA (640×480) as an example, and in a case where the user has determined that there will be 20 blank lines at the top of the display and 20 blank lines at the bottom of the display, the duration of one line of image data is approximately 16.67 ms/520, or approximately 32.1 μs (microseconds).

The trace 206 illustrates the R, G, B image data extracted from each pixel in the original user supplied bitmap image 102. The trace 206 includes pixel data 226, a no-data period 232, pixel data 228 and a no-data period 229. This sequence repeats until a complete frame of data is filled. Then, another frame will begin until all of the image data in the trace 206 is packetized. In an embodiment, the packetizer software 200 will generate a data stream including the RGB data, vertical timing information, horizontal timing information and any appropriate wait periods, as illustrated in the packet stream 210. At this point, the packet stream 210 remains in parallel format.

The packetizer software 200 forms the RGB data into packets based on the timing structure described above. For example, when the vertical timing indicator transitions to logic high at rising edge 212, a packet 232 is created that includes the vertical timing identification point. During the time between the rising edge 212 of the vertical timing indicator 202 and the rising edge 214 of the horizontal timing indicator 204, a wait state, or wait period 234, is created in the data stream 210.

The wait period 234 is an indication to wait a certain amount of time before sending any additional packets to the hardware 300 in order to maintain the exact timing relationship with the original parallel bus that supplied the pixel data. The user-supplied timing information and display parameter information determines the duration of the wait period 234. The wait period may also be different for different portions of the data stream 210 depending on a variety of parameters. As will be described below, the wait period is used by a state machine associated with the hardware 300 to detect how long the state machine should wait before sending a subsequent packet. A Vertical ID packet, a Horizontal ID packet, and pixel ID packets will be transmitted to the hardware 300. However, the wait indicator is used by the parallel data sequencer 310 to detect how much time it should wait for processing a subsequent packet.

At the rising edge 214 of the horizontal timing indicator 204, and when the first horizontal timing indicator is present, the packetizer software 200 creates a packet 236 in the data stream 210. The packet 236 includes the horizontal timing identification point. In an embodiment, the duration of the packet 236 depends on the type of protocol standard being used. A typical duration is 4 bytes, which contains header, ID and error correction bytes. The packet 232 containing the vertical timing indicator and the packet 236 containing the horizontal timing indicator are typically of a fixed duration. The number of bytes contained in these packets and the R, G and b pixel data can be offset, or compensated for, by reducing subsequent wait periods. For example, this is illustrated graphically by showing that the duration of time between the rising edge 212 of the vertical timing indicator 202 and the rising edge 214 of the horizontal timing indicator 204 is longer than the duration of the wait period 234. Similarly, the duration of time between the falling edge 215 of the horizontal timing indicator 204 and the rising edge 216 of the horizontal timing indicator 204 is longer than the duration of the wait period 242.

After the duration of the packet 236, the packetizer software 200 creates a packet 238 containing the image data, in the form of R, G and B pixel data for each pixel in the original bitmap image 102. The packet 238 represents the pixel data 226 in the trace 206. The duration of the wait state 242 is adjusted so that the wait state 242 ends with the next rising edge 216 of the horizontal timing indicator.

When the next horizontal timing indicator is present, as shown by rising edge 216 of the horizontal timing indicator 204, a packet 244 is created that includes the horizontal timing identification point corresponding to the horizontal timing indicator represented at the rising edge 216. After the packet 224, the RGB image data 228 is used to form the packet 246, as described above with respect to packet 238. This process repeats, forming packet 246, wait period 248 and packet 252 until all of the image data in trace 206 is packetized, resulting in a data stream 210 that includes the pixel image data and proper display timing information. The packet data is then transferred to the hardware sequencer memory 330 of FIG. 1 which is described below.

Figure 4:
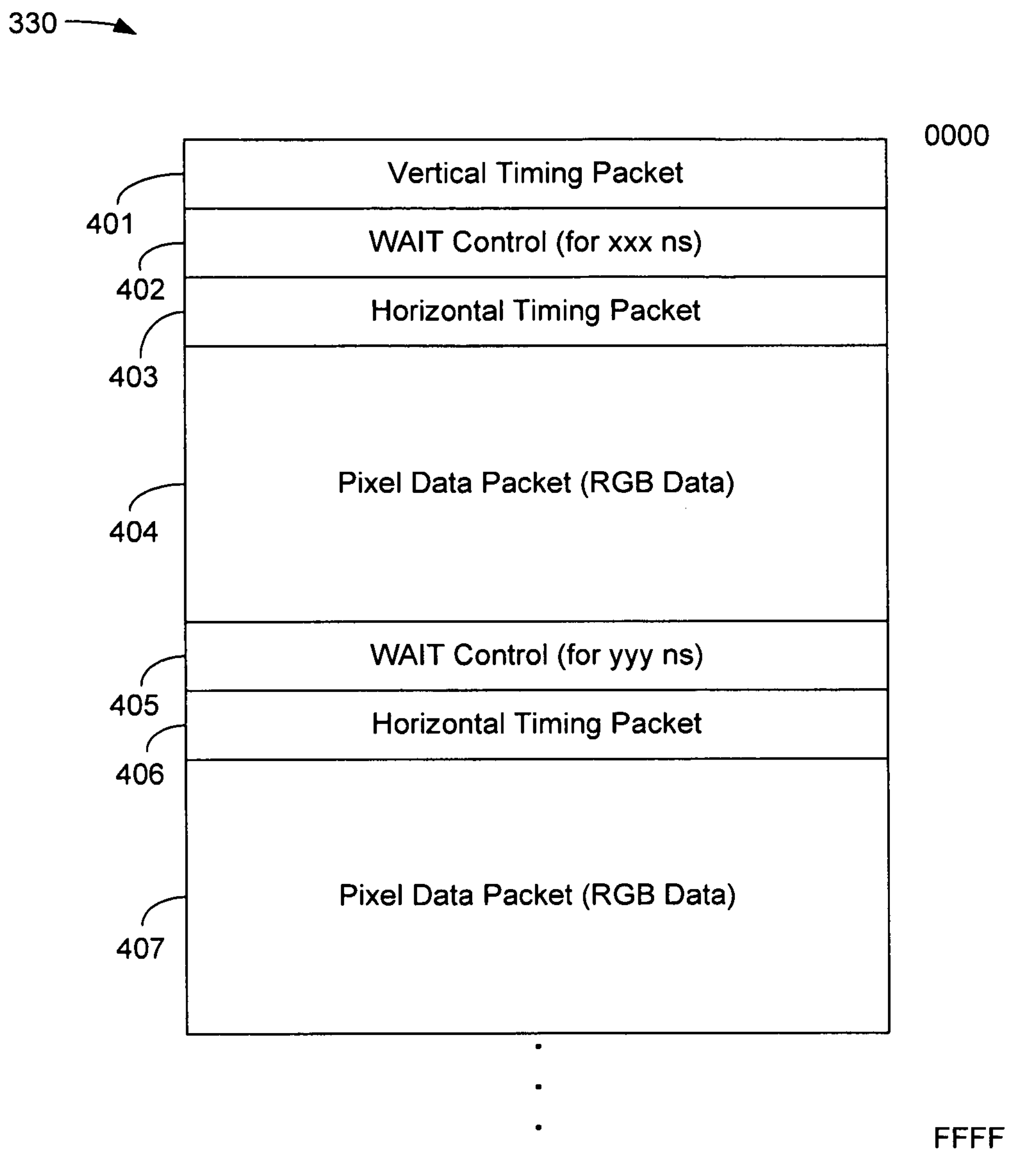
FIG. 4 is a block diagram illustrating an embodiment of the sequencer memory of FIG. 1.

FIG. 4 is a block diagram illustrating an embodiment of the sequencer memory 330 of FIG. 1. The sequencer memory 330 shown in FIG. 4 can be a portion of available memory, or can be a dedicated memory element. Moreover, the memory locations described below are arbitrary. The beginning memory location, 0000, can be considered to be the start of a memory loop and the memory location, FFFF, can be considered as the end of the memory loop. For example, after the data stream (FIG. 3) was loaded from the packetizer software 200 to the sequencer memory 330, the last element of the memory that was loaded with the data stream 210 is considered the end of the loop. The memory size required depends largely on the screen size. For example, an XGA (1024×768) display consumes larger memory than a VGA (640×480) display for one screen worth of data.

Generally, using VGA as an example, which uses 640 pixels per line and 480 lines of data, one video frame would normally be stored in the sequencer memory 330. Relating the sequencer memory 330 to the timing diagram of FIG. 3, the first vertical timing packet (232 of FIG. 3) is stored in memory location 401. The wait period (234 of FIG. 3) is illustrated at memory location 402. The horizontal timing packet (236 of FIG. 3) is shown at memory location 403. The first block of pixel data in packet form (238 of FIG. 3) is shown at memory location 404. The wait period (242 of FIG. 3) is shown in memory location 405. The next horizontal timing packet (244 of FIG. 3) is shown in memory location 406. The next block of pixel data in packet form (246 of FIG. 3) is shown as occupying memory portion 407. The sequencer memory 330 continues until all lines are loaded for a frame.

Figure 5:
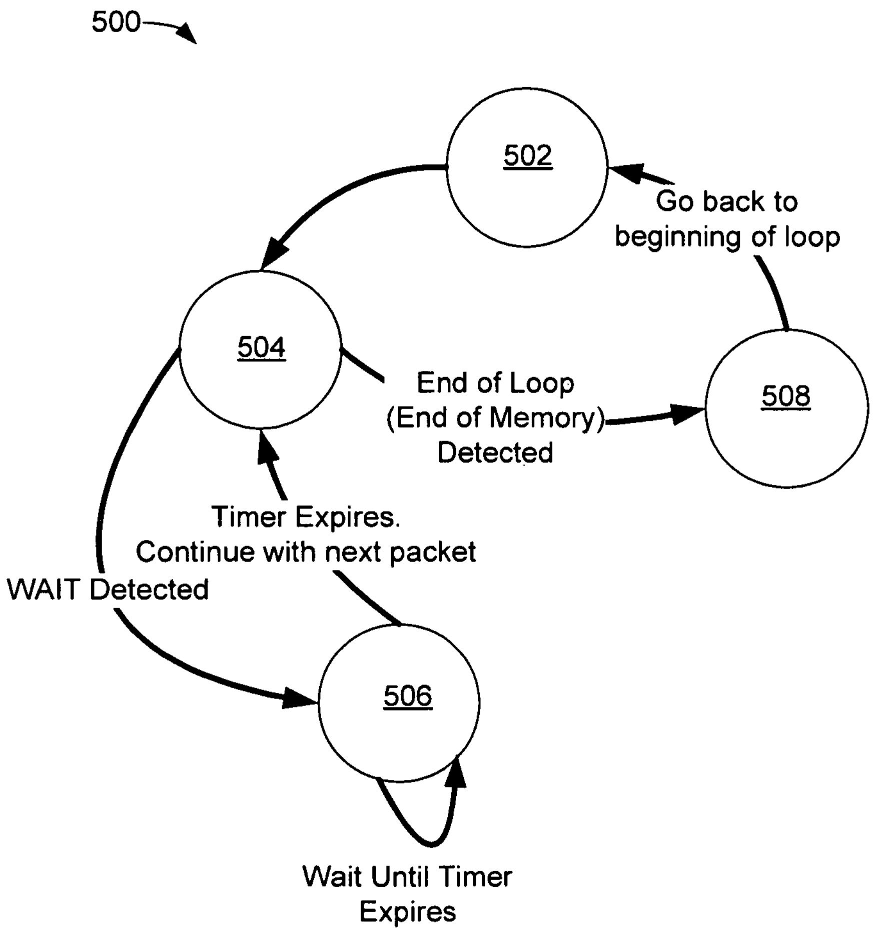
FIG. 5 is a state diagram describing the operation of the sequencer memory of FIG. 4.

FIG. 5 is a state diagram describing the operation of the sequencer memory 330 of FIG. 4. It is assumed that the entire data stream 210 (FIG. 3) for a complete frame of display data was loaded into the sequencer memory 330 (FIG. 4). Once the data stream 210 for a complete frame of display data is loaded into the sequencer memory 330, the process begins in state 502.

In state 504 the state machine processes the vertical timing packet (232 of FIG. 3). In state 504 is then determined whether a wait period is detected. If a wait period is detected, then, in state 506, the timer 320 (FIG. 3) is activated and the hardware 300 remains in the state 506 until the timer 320 expires. The timer wait period is determined by the duration of the wait periods 234, 242, 248 (FIG. 3), etc. The wait period is calculated from the timing waveform of the data stream 210 within the software 200.

After the timer expires, the process proceeds from state 506 to state 504 where additional data is processed by the state machine 500. This process continues until the end of the memory is detected, causing the state to transition to the end of loop state 508. At the end of loop state 508, the process returns to the beginning of loop state 502 to await the next frame of data. At the state 508, the state machine resets the sequencer memory 330 (FIG. 4), so when the state machine returns to state to 502, it can fetch the data from the beginning of the sequencer memory 330 (FIG. 4). The beginning of the sequencer memory 330 is indicated as the "Start of loop" address of 0000 in the sequencer memory 330 of FIG. 4.

Figure 6:
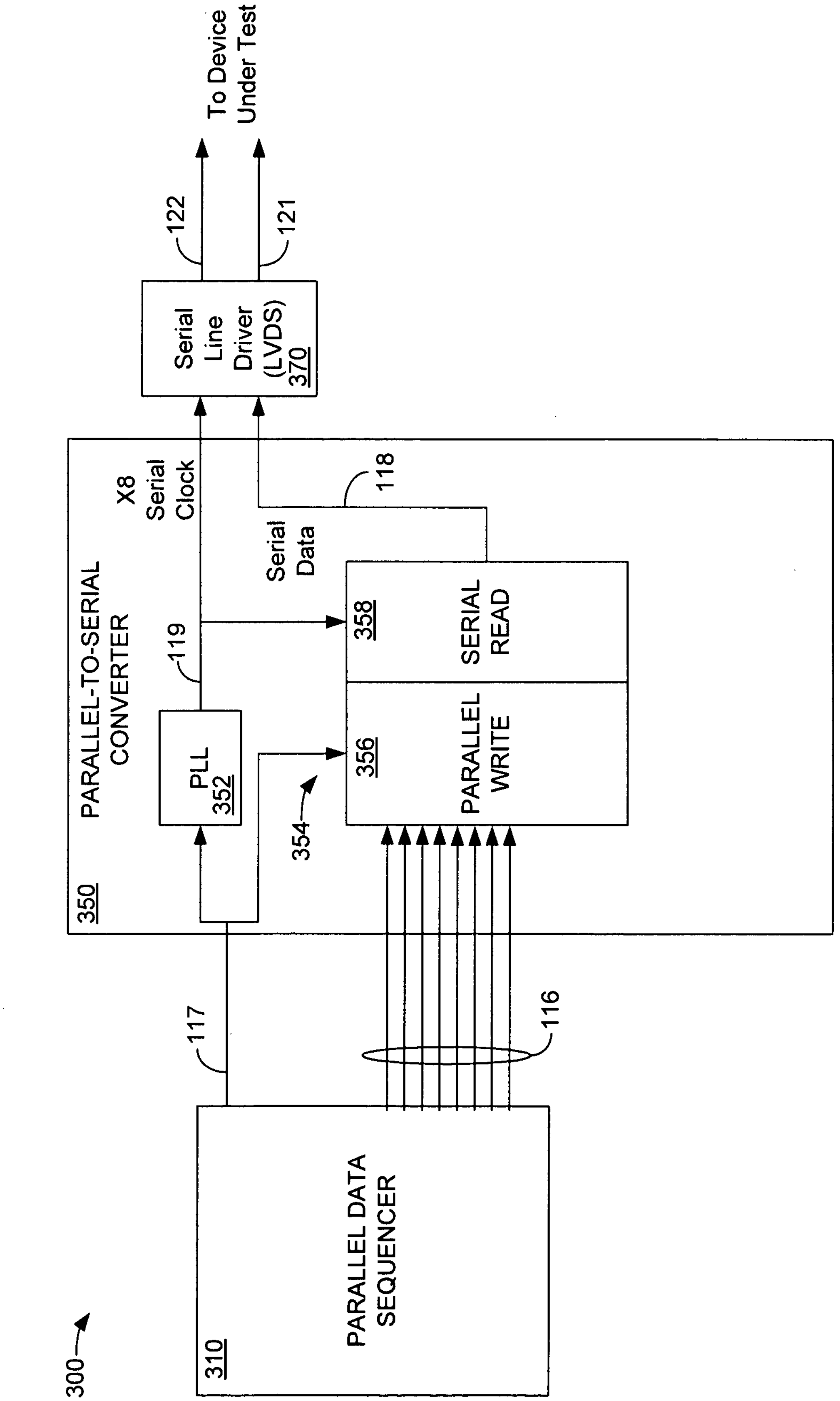
FIG. 6 is a block diagram illustrating in greater detail the hardware element of FIG. 1.

FIG. 6 is a block diagram illustrating in greater detail the hardware element 300 of FIG. 1. The parallel data sequencer 310 provides the parallel data over connection 116 to the parallel to serial converter 350. In an embodiment, eight bits of data (one byte) are provided over connection 116. The parallel data sequencer 310 also provides the parallel clock signal over connection 117 to the parallel to serial converter 350.

The parallel clock signal on connection 117 is provided to a phase lock loop (PLL) multiplier 352, which multiplies the clock signal on connection 117 to a high-speed serial clock on connection 119. In this example, because eight bits of image data are provided on connection 116, the PLL multiplier 352 multiplies the clock signal on connection 117 by a factor of eight (8). The multiplication factor applied by the PLL multiplier 352 depends on the width (the number of bits) of the data bus 116. The high speed serial clock signal is provided over connection 119 to a serial read element 358 and to a serial line driver 370.

The parallel packet data on connection 116 is provided to a parallel write element 356. The clock signal on connection 117 is also provided to the parallel write element 356. The parallel write element 356 and the serial read element 358 comprise a first in first out (FIFO) buffer 354 that converts the parallel data on connection 116 to serial data on connection 118, based on the clock signal on connection 119. The output of the FIFO buffer 354 on connection 118 is the serial packet data. The serial packet data is provided to the serial line driver 370. The serial line driver 370, which, in an embodiment can be a low voltage differential signaling (LVDS) element, adjusts the voltage level and current level of the signals on connections 118 and 119 and provides the serial clock output on connection 122 and provides the serial packetized data on connection 121 to a device under test.

Figure 7:
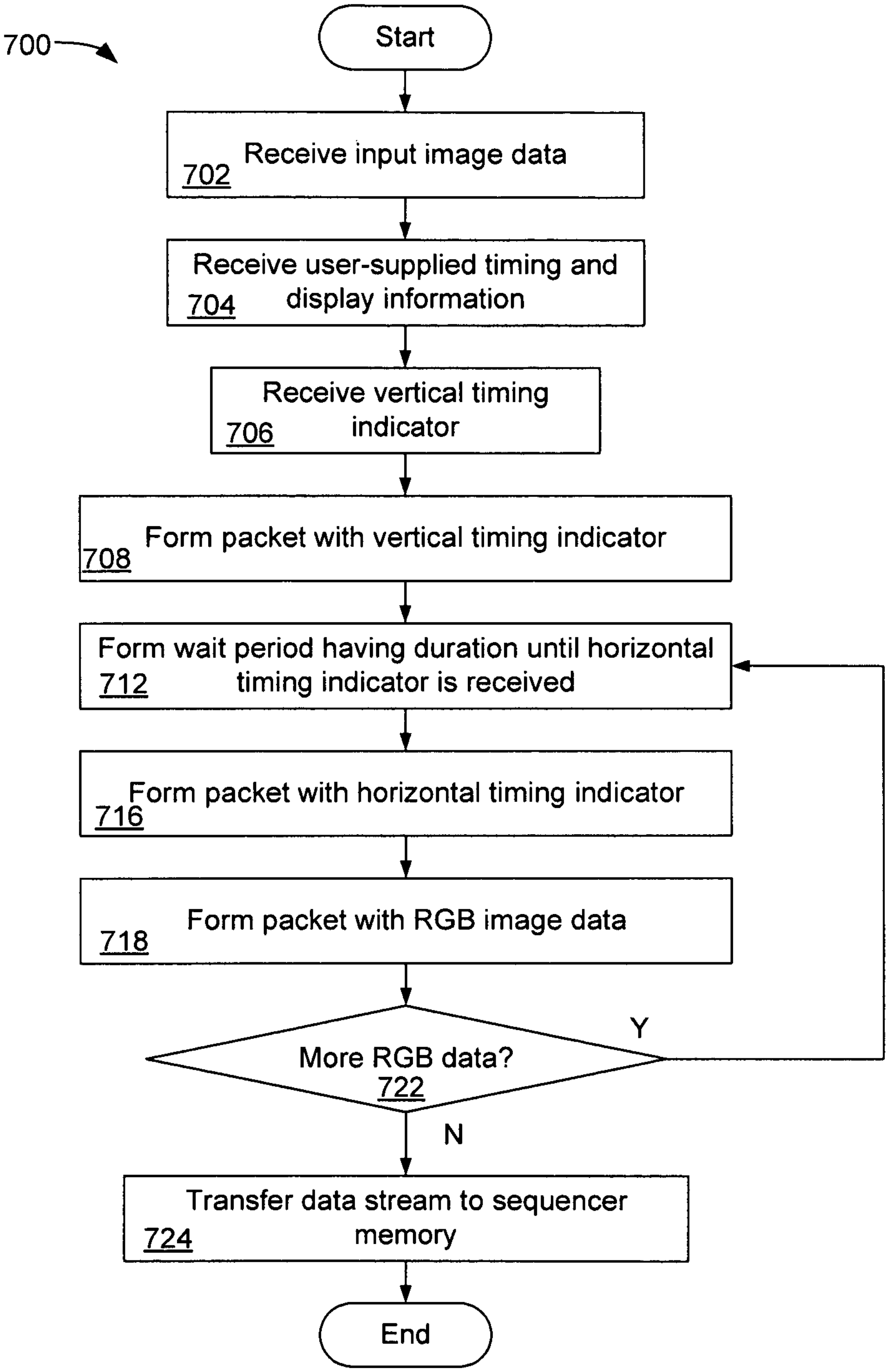
FIG. 7 is a flow chart describing the operation of an embodiment of the software processing portion of the method for packetizing image data for serial transmission.

FIG. 7 is a flow chart 700 describing the operation of an embodiment of the software processing portion of the method for packetizing image data for serial transmission. The flow chart 700 describes the operation of the packetizer software 200, the operation of which occurs prior to transmitting the data stream 210 to the hardware 300. In block 702, the packetizer software 200 receives the input bitmap image 102 in the form of a data stream 206 (FIG. 2). In block 704, the packetizer software 200 receives user-supplied timing and display information.

In block 706, the packetizer software 200 receives the vertical timing indicator (rising edge 212 of FIG. 3). In block 708, the packetizer software 200 forms a packet (232 of FIG. 3) containing the vertical timing indicator. In block 712, the packetizer software forms a wait period 234 (FIG. 3) having a duration that lasts until the appearance of the next horizontal timing indicator. In block 716, the packetizer software 200 forms a packet (236 of FIG. 3) containing the horizontal timing indicator. In block 718, the packetizer software 200 forms a packet (238 of FIG. 3) including a line worth of the R, G and B pixel data (226 of FIG. 3) from the bitmap image.

In block 722 it is determined whether there is any additional R,G,B pixel data. If there is additional R,G,B pixel data, the process returns to block 712 to form a wait period having a duration that lasts until the appearance of the next horizontal timing indicator. If it is determined in block 722 that there is no additional R,G,B pixel data, the frame is transferred to the sequencer memory 330 (FIG. 1) and the process ends.

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for packetizing image data for serial transmission, comprising:
- a software element configured to:
  - receive a bitmap image file comprising R, G and B pixel data;
  - receive display and timing information associated with a device under test, a vertical synchronization signal, and at least one horizontal synchronization signal;
  - packetize the vertical synchronization signal;
  - wait a period of time before packetizing the horizontal synchronization signal;
  - packetize the R, G, and B pixel data associated with the bitmap image file to form a parallel packet stream; and
- a hardware element comprising:
  - a parallel data sequencer comprising a memory, the memory configured to store the parallel packet stream;
  - a parallel-to-serial converter configured to convert the parallel packet stream into a serial packet stream; and
  - a serial line driver configured to transfer the serial packet stream to a device under test.

2. The system of claim 1, wherein the wait period is adjustable to compensate for a duration of the packetized horizontal synchronization signal and a duration of the packetized R, G and B pixel data.

3. The system of claim 1, further comprising a logic analyzer configured to receive the serial packet stream, the logic analyzer configured to transform the serial packet stream to recover the bitmap image data and display the image associated with the bitmap image data.

4. The system of claim 1, wherein the display and timing information associated with the device under test comprise at least one of frame rate, a number of blank lines before pixel data begins, a number of blank pixels from where the pixel data ends to the end of a horizontal line, and the number of blank lines after the end of the pixel data.

5. The system of claim 1, wherein a duration of the wait period is determined, at least in part, by the received display and timing information.

6. A non-transitory computer readable medium storing a program, executable by a processor, for packetizing image data for serial transmission from a test and measurement device to a device under test, the computer readable medium comprising code configured to:
- receive a bitmap image file comprising R, G and B pixel data;
- receive display and timing information associated with a device under test, a vertical synchronization signal, and at least one horizontal synchronization signal;
- packetize the vertical synchronization signal;

wait a period of time after packetizing the vertical synchronization signal and subsequently packetize the horizontal synchronization signal; and packetize the R, G, and B pixel data associated with the bitmap image file to form a parallel packet stream.

7. A system comprising:

the non-transitory computer readable medium of claim 6; and a hardware element comprising:

a parallel data sequencer comprising a memory, the memory configured to store the parallel packet stream;

a parallel-to-serial converter configured to convert the parallel packet stream into a serial packet stream; and a serial line driver configured to transfer the serial packet stream to a device under test.

8. The system of claim 7, wherein the wait period is adjustable to compensate for a duration of the packetized horizontal synchronization signal and the duration of the packetized R, G and B pixel data.

9. The system of claim 7, further comprising:

a logic analyzer configured to receive the serial packet stream, the logic analyzer configured to transform the serial packet stream to recover the bitmap image data and display the image associated with the bitmap image data.

10. The non-transitory computer readable medium of claim 6, wherein the display and timing information associated with the device under test is chosen from frame rate, a number of blank lines before pixel data begins, a number of blank pixels from where the pixel data ends to the end of a horizontal line, and the number of blank lines after the end of the pixel data.

11. A method for packetizing image data for serial transmission, comprising:

receiving a bitmap image file;

receiving display parameters and timing information;

receiving a vertical synchronization signal;

packetizing the vertical synchronization signal;

generating a wait period prior to receipt of a horizontal synchronization signal;

packetizing the horizontal synchronization signal;

packetizing R, G, and B pixel data associated with the bitmap image file to form a parallel packet stream;

serializing the parallel packet stream to form a serial packet stream; and transferring the serial packet stream to a device under test.

12. The method of claim 11, wherein the wait period is adjustable to compensate for a duration of the packetized horizontal synchronization signal and a duration of the packetized R, G and B pixel data.

13. The method of claim 12, wherein the display parameters and timing information comprise at least one of frame rate, a number of blank lines before pixel data begins, a number of blank pixels from where the pixel data ends to the end of a horizontal line, and the number of blank lines after the end of the pixel data.

14. The method of claim 11, wherein a duration of the wait period is determined, at least in part, by the received display parameters and timing information.

* * * * *

UNITED STATES PATENT AND TRADEMARK OFFICE

CERTIFICATE OF CORRECTION

PATENT NO. : 8,457,160 B2
APPLICATION NO. : 12/472406
DATED : June 4, 2013
INVENTOR(S) : Takuya Otani It is certified that error appears in the above-identified patent and that said Letters Patent is hereby corrected as shown below:

On the Title page, in "Assistant Examiner", in column 2, line 1, Delete "Robert A. Shand" and insert -- Roberta A. Shand --, therefor.

Signed and Sealed this
Sixth Day of August, 2013

Teresa Stanek Rea
*Acting Director of the United States Patent and Trademark Office*